(12) United States Patent
Warren

(10) Patent No.: US 6,842,949 B2
(45) Date of Patent: Jan. 18, 2005

(54) U-SHAPED WIRE ROPE CLAMP

(76) Inventor: Robert E. Warren, 15 Kenquit Rd., Warren, NJ (US) 07059

( * ) Notice: Subject to any disclaimer, the term of this patent is extended or adjusted under 35 U.S.C. 154(b) by 0 days.

(21) Appl. No.: 10/440,723

(22) Filed: May 19, 2003

(65) Prior Publication Data

US 2004/0231113 A1 Nov. 25, 2004

(51) Int. Cl.[7] ............................. F16B 39/28; F16G 11/06
(52) U.S. Cl. .................. 24/135 N; 24/122.6; 24/135 R; 24/115 H; 24/545; 24/563; 411/175; 403/309; 403/371
(58) Field of Search .......................... 24/135 N, 135 R, 24/122.6, 132 WL, 136 B, 115 H, 275, 278, 68 CD, 545, 563; 114/218; 403/371, 309, 385, 369; 294/102.1; 16/205; 411/174, 175

(56) References Cited

U.S. PATENT DOCUMENTS

| | | | | |
|---|---|---|---|---|
| 1,321,660 A | * | 11/1919 | Moriarty ..................... | 24/135 R |
| 1,730,197 A | * | 10/1929 | Elsey ......................... | 24/135 R |
| 2,363,210 A | * | 11/1944 | Tinnerman .................. | 411/175 |
| 2,485,445 A | * | 10/1949 | Hoffman .................... | 24/135 R |
| 2,499,981 A | * | 3/1950 | Strobel ....................... | 24/135 R |
| 3,217,773 A | * | 11/1965 | Munse ........................ | 411/175 |
| 4,195,895 A | * | 4/1980 | Ziegler ....................... | 24/135 N |
| 4,493,134 A | | 1/1985 | Karr | |
| 4,662,035 A | * | 5/1987 | Hatfield ..................... | 24/135 R |
| 4,974,549 A | * | 12/1990 | Gordon ...................... | 24/135 R |
| 5,039,264 A | * | 8/1991 | Benn .......................... | 411/175 |
| 5,423,646 A | * | 6/1995 | Gagnon ...................... | 411/174 |
| 5,802,680 A | | 9/1998 | Postelwait | |
| 5,961,264 A | * | 10/1999 | Postadan .................... | 411/174 |
| 6,327,753 B1 | | 12/2001 | Rushing | |
| 6,688,825 B1 | * | 2/2004 | Stewart et al. .............. | 411/174 |

* cited by examiner

Primary Examiner—Victor Sakran
(74) Attorney, Agent, or Firm—Thomas R. Shaffer, Esq.

(57) ABSTRACT

A wire rope clamp includes a U-shaped clamp member having a central fold. The clamp member has a first plate portion on one end of the central fold and a second plate portion on an opposite end of the central fold. The clamp member has a least one opening therein sized to allow at least one wire rope to pass therethrough. Such opening is located on said central fold between opposite sides of the clamp member. A tightening member urges the first plate portion and the second plate portion relatively closer together causing the plate portions to clamp onto one or more wire ropes located therebetween. The plate portions have embossments perpendicular to the rope direction that provide sufficient clamping grip.

16 Claims, 4 Drawing Sheets

U-SHAPED WIRE ROPE CLAMP

BACKGROUND OF THE INVENTION

1. Field of the Invention

The present invention relates to a wire rope clamp. More particularly, the present invention relates to a U-shaped clamp having a first plate portion and a second plate portion on opposite sides of a central fold which, when moved closer together, clamp onto a wire rope which passes through an opening in the central fold.

2. Prior Art

A variety of wire rope clamps have been proposed. Perhaps the most common form of a wire rope clamp is a U-bolt and saddle combination. This device includes a U-bolt member of circular cross section with two parallel spaced apart threaded legs. A separate saddle member have openings to receive the legs is provided to straddle the two legs. The saddle is urged closer to the U end of the U-bolt member by tightening two nuts onto the threaded legs. Because the devices include four separate pieces, assembly may be difficult. Further, because of the circular cross section of the U-bolt member, a single concentrated contact with unconstrained pressure may be exerted onto the wire rope and thereby distort and weaken the wire rope. Further, when two sections of the wire rope are connected, they typically become twisted and do not remain in a single plane causing uneven pressure.

Postelwait, U.S. Pat. No. 5,802,680, discloses a wire rope clamp which utilizes two identical bolt/saddle members. While such a design attempts to address difficulties in assembly by providing bolts 12, 36 which do not rotate after insertion into saddles 10, 34. However, the details regarding wire rope engaging surfaces 18 and 42 are not disclosed and thus distortion and weakening of the wire rope is still a possibility. Also, this design appears to be expensive to manufacture.

Karr, U.S. Pat. No. 4,493,134, discloses a rope clamping device in the form of a two identical hinge plates 11 pivotally connected by hinge pin 13 and fastened or secured by a locking pin 15. Karr also teaches the provision of serpentine grooves 39 to impact necessary frictional engagement to retain the rope segments within the clamp 11. While the use of plate members is desirable to avoid damage to the wire rope, the provision of frictional engagement by means of serpentine groove is overly complex and expensive to manufacture and requires excessive time when used to thread the wire rope into the groove. Further, there is no means to further tighten the device after the lock pin is in place.

Rushing, U.S. Pat. No. 6,327,753, discloses a cable clamp which utilizes a traveling block 3 which moves within housing 2 by turning threaded member 4. The block secures the cables 16 into channels 15 provided in the housing by applying downward pressure thereon. While the Rushing reference provides a device which addresses the many problems associated with the typical U-bolt and saddle designs, such a device is overly complex and expensive to manufacture.

Thus, there remains a need for a simple and cost-effective wire rope clamp which provides a solution to the problems associated with typical U-bolt and saddle designs.

SUMMARY OF THE INVENTION

As used in this patent, the term "wire rope" is intended to be used in a broader sense than such a term is typically used and is hereby defined to include any type of rope, line, or cable. The term includes insulated and bare ropes, lines, and cables, and is intended to include both the singular and the plural. The term includes, but not is limited to, braided wire rope or cable, single strand rope or wire, coaxial cable, and various other types of ropes, lines and cables. With this expanded meaning defined, the preferred use for the present invention and the primary use for which the present invention is specifically designed is for clamping "wire rope" in the more narrow sense that such a term is ordinarily and typically defined and utilized.

In its simplest form, the present invention provides a wire rope clamp comprising a U-shaped clamp member having a central fold therein, said clamp member having a first plate portion on one end of said central fold and a second plate portion on an opposite end of said central fold, said clamp member having at least one opening located on said central fold between opposite sides of said clamp member for at least one wire rope to pass through, said first plate portion and said second plate portion being spaced apart and having a sufficient spacing gap therebetween for at least one wire rope to pass therethrough, and tightening means to urge said first plate portion and said second plate portion relatively closer together causing said plate portions to clamp onto at least one wire rope located therebetween.

Preferably, said tightening means further comprises at least one bolt hole formed in said first plate portion, at least one threaded bolt hole formed in said second plate portion and at least one threaded bolt adapted to pass through said at least one bolt hole and adapted to be threaded into said at least one threaded bolt hole whereby tightening said bolt urges said first plate portion and said second plate portion relatively closer together causing said plate portions to clamp onto at least one wire rope located therebetween. Said threaded bolt hole is preferably extruded to have a depth greater than the thickness of said second plate portion, and said extruded depth is sufficient to provide at least 5 threads within said extruded hole.

Alternatively, said tightening means further comprises a least one bolt hole formed in said first plate portion and at least one bolt hole formed in said second plate portion and at least one threaded bolt and cooperating nut, said at least one threaded bolt adapted to pass through said bolt holes in said first and second plate portions whereby tightening said nut onto said at least one bolt urges said first plate portion and said second plate portion relatively closer together causing said plate portions to clamp onto at least one wire rope located therebetween.

Preferably, said clamp member is formed of aluminum and said tightening means is formed of stainless steel although any type of metallic or non-metallic materials may be utilized.

Preferably, said at least one opening further comprises a pair of spaced apart openings located on opposite sides of a middle arch portion of the central fold, said middle arch portion located at the midpoint of the central fold between opposite sides of the clamp member.

Preferably, said at least one bolt hole formed in said first plate portion further comprises a pair of bolt holes, wherein said at least one threaded bolt hole, threaded extruded bolt hole or bolt hole formed in said second plate portion further comprises a pair of said bolt holes and wherein said at least one threaded bolt further comprises a pair of threaded bolts. Said pair of bolt holes are spaced apart and are located on a bolt line on said first plate portion which is spaced from and parallel to said central fold and wherein said pair of bolt holes (which may be threaded or unthreaded) are spaced apart and are located on a bolt line on said second plate portion which is spaced from and parallel to said central fold. Preferably, the spacing of the bolts passing through the pair of bolt holes is sufficient to allow the passage of at least one wire rope between the bolts.

Preferably, said first plate portion includes at least one first plate portion embossment creating a crest on an inner surface of said first plate portion which extends between opposite sides of said clamp member parallel to said central fold. Said first plate portion embossment is preferably located on a bolt line of said first plate portion.

Preferably, said second plate portion includes at least one second plate portion embossment creating a crest on an inner surface of said second plate portion which extends between opposite sides of said clamp member parallel to said central fold. Preferably, said at least one second plate portion embossment further comprises a pair of second plate portion embossments with each of said pair of second plate portion embossments located parallel to but spaced apart from a bolt line of the second plate portion.

Preferably, said first plate portion and said second plate portion are spaced apart and generally parallel to one another and are connected by said central fold.

DETAILED DESCRIPTION OF THE PREFERRED EMBODIMENTS

Referring to the Figures, the wire rope clamp 10 of the present invention includes a first plate portion 20 and a second plate portion 30 which are connected together by a central fold 40. The first plate portion 20 is spaced apart from second plate portion 30 to provide a sufficient gap to allow for the insertion of one or more wire ropes between the plates as will be hereinafter described. Preferably, first plate portion 20 and second plate portion 30 are generally parallel to one another.

Figure 1:
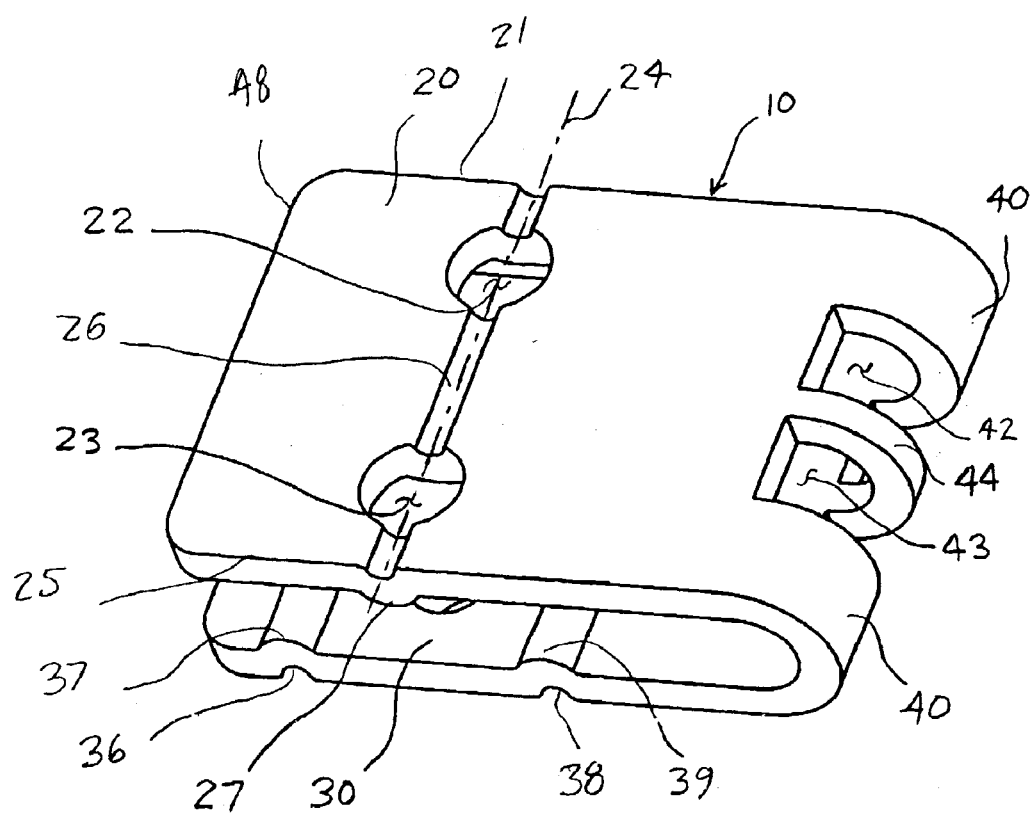
FIG. 1 is a perspective view of the wire rope clamp of the present invention showing the first plate portion.

The first plate portion 20 preferably includes a pair of spaced apart bolt holes 22 and 23. The bolt holes 22 and 23 are positioned along a bolt line 24 as shown in FIG. 1. The bolt line 24 is spaced from and parallel to the central fold 40. The first plate portion 20 also includes a first plate embossment 26 which extends from opposite sides 21 and 25 of first plate portion 20 and is parallel to the central fold 40. The embossment 26 creates a crest 27 on an inner surface of the first plate portion 20.

The second plate portion 30 includes a pair of spaced apart threaded bolt holes 32 and 33. The bolt holes are extruded so as to form a collar 34 around each bolt hole 32 and 33. Also, the bolt holes 32 and 33 are extruded to provide a material thickness sufficient to receive at least 5 threads 35 into which bolts 62 and 63 are screwed. The second plate portion 30 also includes a pair of embossments 36 and 38 which extend from opposite sides of the second plate portion and which are parallel to and spaced apart from the central fold 30. Embossments 36 and 38 create crest portions 37 and 39, respectively, on an inner surface of second plate portion 30.

The central fold 40 preferably includes a pair of spaced apart openings 42 and 43 therein which are provided on opposite sides of a central arch portion 44 of the central fold 40. The openings 42 and 43 are of sufficient size to receive at least one wire rope therethrough.

Figure 2:
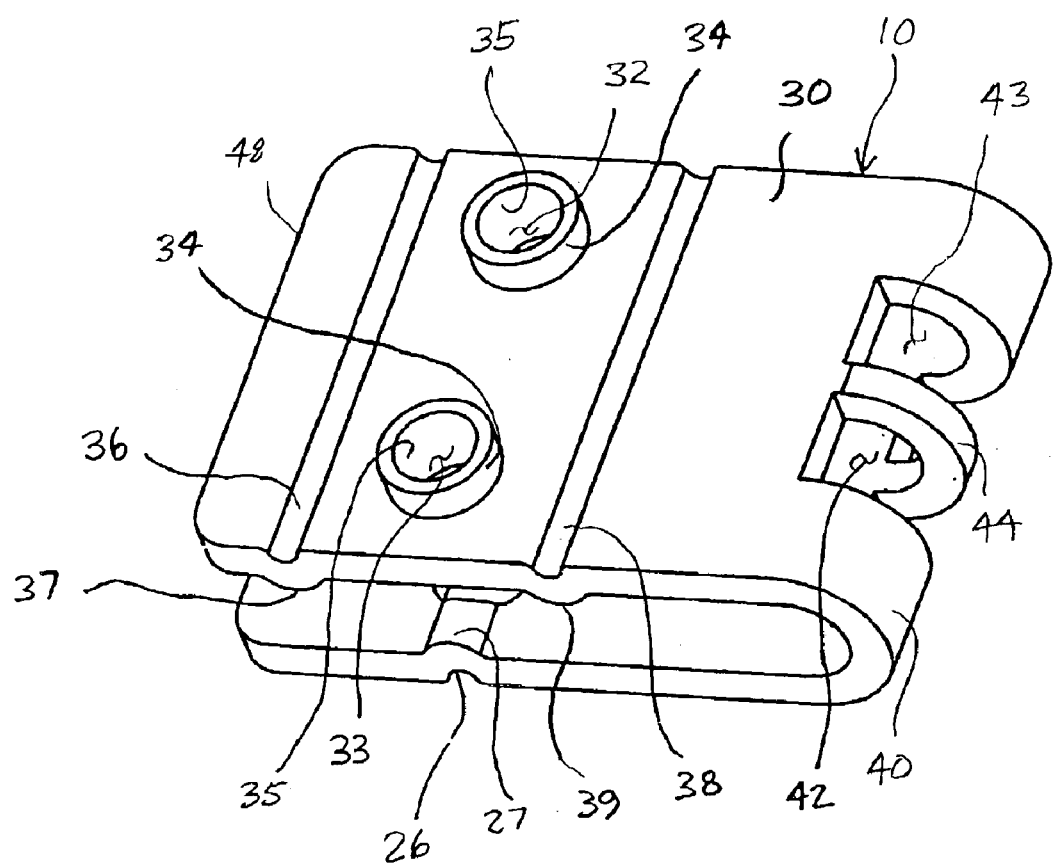
FIG. 2 is a perspective view of the wire rope clamp of the present invention showing the second plate portion.
Figure 3:
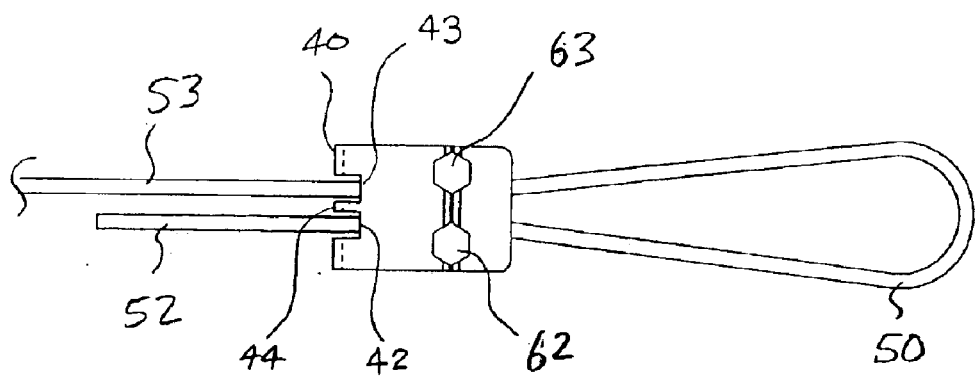
FIG. 3 is a top plan view of the wire rope clamp of the present invention showing the device as clamped onto a wire rope.
Figure 4:
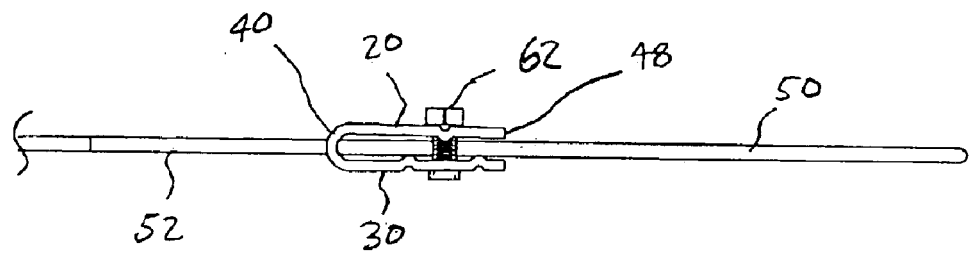
FIG. 4 is a side elevational view of the wire rope clamp of the present invention as clamped onto a wire rope.
Figure 5:
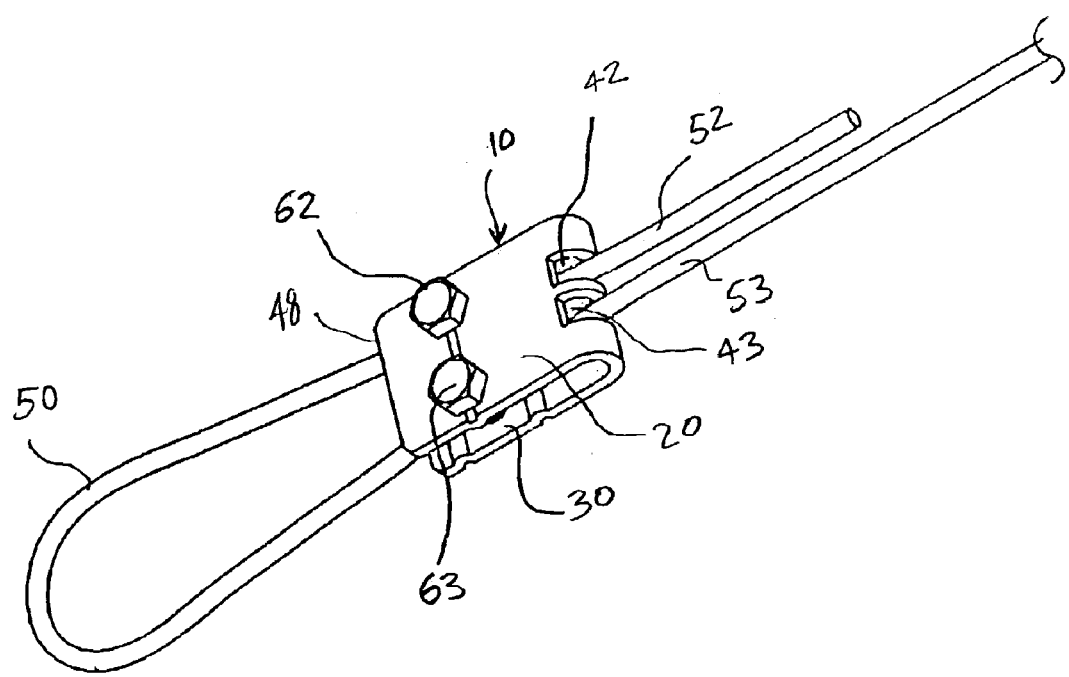
FIG. 5 is a perspective view of the wire rope clamp of the present invention as clamped onto a wire rope.

Referring to FIGS. 3, 4 and 5, a wire rope 50 having a cut end segment 52 and an uncut segment 53 is shown. In operation, the cut end segment 52 is fed through the wire rope clamp starting at opening 43, is passed between bolts 62 and 63 and exits at side 48. Then, the cut end segment 52 is looped back on itself, is fed back through side 48, is passed between bolts 62 and 63 and exits through opening 42. Conversely, although not shown since the orientation of the wire rope clamp is not important, cut end segment 52 can be fed first through side 48 and looped back to exit and finish at side 48. Once in position, bolts 62 and 63 are tightened into threaded holes 32 and 33, respectively, causing the first plate portion 20 and the second plate portion 30 to move relatively closer together and clamp onto the wire rope 50 which is positioned therebetween. It will be obvious to those skilled in the art that the embossments 26, 36 and 38, shown in FIGS. 1 and 2, will aid in gripping onto the wire rope 50.

As best shown in FIG. 5, the present invention greatly reduces the risk of distorting and weakening the wire rope 50 by providing a pair of spaced apart plate portions 20 and 30 in the form of generally flat planar surfaces rather than the circular cross-section leg members of the typical U-bolt saddle clamp which can distort and weaken the wire rope. The present invention provides a cost-effective and simple means of not only clamping a wire rope but keeping the wire rope segments 52 and 53 spaced apart in a single plane by constraining said segments with openings 43 and 43, plate portions 20 and 30, and bolts 62 and 63.

It will be understood that the wire rope clamp of the present invention may be made from any material which has sufficient rigidity to retain a general U-shaped configuration. While the device could be made from plastic or nylon materials, metallic materials are preferred. If cost is a primary concern, the clamp member and bolts may be made from zinc plated steel. However, since such materials tend to rust over time, they make the removal of the wire clamp exceeding difficult after rust appears. Accordingly, although more costly, if the wire clamp will ever need to be removed, it is preferred that the wire rope clamp itself be formed of aluminum and that the bolts be made of stainless steel.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. A wire rope clamp comprising:

a U-shaped clamp member having a central fold therein, said fold extending longitudinally between opposite sides of said clamp, said clamp member having a first plate portion on one end of said central fold and a second plate portion on an opposite end of said central fold, said clamp member having at least one opening located on said central fold at a location between said opposite sides of said clamp member for at least one wire rope to pass through, said at least one wire rope oriented transversely relative to said fold and said at least one wire rope passing transversely through said at least one opening in said fold, said first plate portion and said second plate portion being spaced apart and having a sufficient spacing gap therebetween for at least one wire rope to pass therethrough, and tightening means to urge said first plate portion and said second plate portion relatively closer together causing said plate portions to clamp onto said at least one wire rope located therebetween.

2. A wire rope clamp according to claim 1 wherein said tightening means further comprises at least one bolt hole formed in said first plate portion, at least one threaded bolt hole formed in said second plate portion and at least one threaded bolt adapted to pass through said at least one bolt hole and adapted to be threaded into said at least one threaded bolt hole whereby tightening said bolt urges said first plate portion and said second plate portion relatively closer together causing said plate portions to clamp onto at least one wire rope located therebetween.

3. A wire rope clamp according to claim 2 wherein said threaded bolt hole is extruded to have a depth greater than the thickness of said second plate portion, and said extruded depth is sufficient to provide at least 5 threads within said extruded hole.

4. A wire rope clamp according to claim 2 wherein said at least one bolt hole formed in said first plate portion further comprises a pair of bolt holes, wherein said at least one threaded bolt hole formed in said second plate portion further comprises a pair of said bolt holes and wherein said at least one threaded bolt further comprises a pair of threaded bolts.

5. A wire rope clamp according to claim 4 wherein said pair of bolt holes on said first plate portion are spaced apart and are located on a bolt line on said first plate portion which is spaced from and parallel to said central fold and wherein said pair of threaded bolt holes on said second plate portion are spaced apart and are located on a bolt line on said second plate portion which is spaced from and parallel to said central fold.

6. A wire rope clamp according to claim 4 wherein the spacing of the bolts passing through the pair of bolt holes is sufficient to allow the passage of at least one wire rope between the bolts.

7. A wire rope clamp according to claim 1 wherein said tightening means further comprises at least one bolt hole formed in said first plate portion and at least one bolt hole formed in said second plate portion and at least one threaded bolt and cooperating nut, said at least one threaded bolt adapted to pass through said bolt holes in said first and second plate portions whereby tightening said nut onto said at least one bolt urges said first plate portion and said plate portion relatively closer together causing said plate portions to clamp onto at least one wire rope located therebetween.

8. A wire rope clamp according to claim 7 wherein said at least one bolt hole formed in said first plate portion further comprises a pair of bolt holes, wherein said at least one bolt hole formed in said second plate portion further comprises a pair of said bolt holes and wherein said at least one threaded bolt further comprises a pair of threaded bolts.

9. A wire rope clamp according to claim 8 wherein said pair of bolt holes on said first plate portion are spaced apart and are located on a bolt line on said first plate portion which is spaced from and parallel to said central fold and wherein said pair of threaded bolt holes on said second plate portion are spaced apart and are located on a bolt line on said second plate portion which is spaced from and parallel to said central fold.

10. A wire rope clamp according to claim 8 wherein the spacing of the bolts passing through the pair of bolt holes is sufficient to allow the passage of at least one wire rope between the bolts.

11. A wire rope clamp according to claim 1 wherein said at least one opening further comprises a pair of spaced apart openings located on opposite sides of a middle arch portion of the central fold, said middle arch portion located at the midpoint of the central fold between opposite sides of the clamp member.

12. A wire rope clamp according to claim 1 wherein said first plate portion includes at least one first plate portion embossment creating a crest on an inner surface of said first plate portion which extends between opposite sides of said clamp member parallel to said central fold.

13. A wire rope clamp according to claim 12 wherein said first plate portion embossment is located on a bolt line of said first plate portion.

14. A wire rope clamp according to claim 1 wherein said second plate portion includes at least one second plate portion embossment creating a crest on an inner surface of said second plate portion which extends between opposite sides of said clamp member parallel to said central fold.

15. A wire rope clamp according to claim 14 wherein said at least one second plate portion embossment further comprises a pair or second plate portion embossments each of said pair of second plate portion embossments located parallel to but spaced apart from a bolt line of the second plate portion.

16. A wire rope clamp according to claim 1 wherein said first plate and said second plate portion are spaced apart and generally parallel to one another and are connected by said central fold.

* * * * *